United States Patent
Putzig et al.

(10) Patent No.: US 6,303,738 B1
(45) Date of Patent: Oct. 16, 2001

(54) ESTERIFICATION PROCESS

(75) Inventors: Donald Edward Putzig, Newark, DE (US); Kathy Lynn Fortmann, Werl-Hilbeck (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/633,039

(22) Filed: Aug. 4, 2000

(51) Int. Cl.$^7$ .................................................. C08G 64/00
(52) U.S. Cl. ............................................. 528/271; 528/272
(58) Field of Search ................................... 528/279, 286, 528/302, 308, 308.6; 524/706, 783

(56) References Cited

U.S. PATENT DOCUMENTS

| | | | |
|---|---|---|---|
| 3,056,818 | 10/1962 | Werber | 260/410.6 |
| 3,326,965 | 6/1967 | Scheitheis et al. | 260/475 |
| 3,338,935 | 8/1967 | Kerschner et al. | 260/429.5 |
| 3,441,540 | 4/1969 | Müller et al. | 260/75 |
| 4,010,145 | 3/1977 | Russin et al. | 260/75 R |
| 4,128,535 | 12/1978 | Baker | 528/272 |
| 4,277,415 | 7/1981 | Sugerman et al. | 260/429.5 |
| 4,361,694 | 11/1982 | Weinberg et al. | 528/279 |
| 4,424,140 | 1/1984 | Weinberg et al. | 502/155 |
| 4,482,700 | 11/1984 | Kühnrich et al. | 528/279 |
| 4,512,928 | 4/1985 | Sugerman et al. | 260/410.9 R |
| 4,780,527 | 10/1988 | Tong et al. | 528/279 |
| 5,015,759 | 5/1991 | Lowe | 560/91 |
| 5,120,822 | 6/1992 | Hoeschele et al. | 528/272 |
| 5,134,222 | 7/1992 | Cooke et al. | 528/272 |
| 5,162,153 | 11/1992 | Cooke et al. | 428/373 |
| 5,237,042 | 8/1993 | Kim et al. | 528/279 |
| 5,453,479 | 9/1995 | Borman et al. | 528/279 |
| 5,866,710 | 2/1999 | Ridland et al. | 560/98 |
| 5,902,873 | 5/1999 | Banach et al. | 528/279 |
| 5,922,828 | 7/1999 | Schiraldi | 528/279 |
| 6,043,335 | 3/2000 | Banach et al. | 528/279 |

FOREIGN PATENT DOCUMENTS

| | | |
|---|---|---|
| 0 634 435 A1 | 1/1995 | (EP) . |
| 0 812 818 A1 | 12/1997 | (EP) . |
| 46-27552 | 8/1971 | (JP) . |
| 47-26437 | 7/1972 | (JP) . |
| 60147430 | 8/1985 | (JP) . |
| 61-11248 | 4/1986 | (JP) . |
| 61-25738 | 6/1986 | (JP) . |
| 63-15937 | 4/1988 | (JP) . |
| 4-80932 | 12/1992 | (JP) . |
| 7-39481 | 5/1995 | (JP) . |
| 07242742 | 9/1995 | (JP) . |
| 7-242-742 | 9/1995 | (JP) . |
| 10-259295 | 9/1998 | (JP) . |
| 11-236442 | 8/1999 | (JP) . |
| WO 97/47675 | 12/1997 | (WO) . |
| WO 99/28033 | 6/1999 | (WO) . |

Primary Examiner—Terressa M. Boykin

(57) ABSTRACT

A process for producing a polyester or copolymer thereof is disclosed. The process comprises contacting at least one carbonyl compound such as, for example, adipic acid, terephthalic acid, salt thereof, or combinations thereof, in the presence of a catalyst, with an alcohol such as, for example, 1,4-butanediol. The catalyst can comprise a tetraalkyl titanate such as, for example, tetraisopropyl titanate and a phosphorous compound such as, for example, a mixture of butyl phosphate and dibutyl phosphate.

13 Claims, No Drawings

ESTERIFICATION PROCESS

FIELD OF THE INVENTION

The invention relates to a process for controlling color formation in polyesters and co-polymers using a catalyst comprising titanium and phosphorous.

BACKGROUND OF THE INVENTION

Polyesters such as, for example, polyethylene terephthalate and polybutylene terephthalate, generally referred to as "polyalkylene terephthalates", are a class of important industrial polymers. They are widely used in thermoplastic fibers, films, and molding applications. They are generally produced by transesterification of a dialkyl terephthalate ester with a glycol or by direct esterification of terephthalic acid with the selected glycol followed by polycondensation. A catalyst is used to catalyze the esterification or polycondensation. Frequently an organic titanium compound is used as the catalyst of choice for the esterification and/or polycondensation. Certain phosphorus compounds may also be added during or after the esterification and polycondensation steps as catalyst modifiers.

An important group of polyesters are those polymers made with adipic acid and a glycol, or copolymers made with a combination of adipic acid and terephthalic acid, with a glycol such as 1,4-butanediol.

A titanium compound is often used as catalyst for the production of polyester. However, when an organic titanium compound is used as the polycondensation catalyst with adipic acid-containing monomers, the resulting polymer or copolymer is typically intensely colored, generally red. This is probably attributed to a complex formed between the titanium and the adipic acid or adipate ester.

For example, WO 99/28,033 discloses an organometallic compound suitable for use as catalyst for the preparation of an ester comprising the reaction product of an orthoester or condensed orthoester of titanium, zirconium, or aluminum, an alcohol containing at least two hydroxyl groups, an organophosphorous compound containing at least one P—OH group, and a base. It does not disclose or suggest a process useful for preventing formation of color during the polycondensation of adipic acid-based polymers or copolymers. JP 11236,442A discloses a method for producing a polyester consisting of adipic acid and 1,4-butanediol using a titanium compound as condensation catalyst to produce a molten polyester and, adding after the polycondensation step a pentavalent phosphorous compound containing at least one hydroxyl group. Since this method requires the titanium and adipate compounds to be in contact before addition of the phosphorus compound, it is only partially effective in preventing formation of a red color. JP 04080932B discloses preparation of adipic acid copolymers comprising esterification or transesterification of terephthalic acid or its derivative and butanediol in the presence of a titanium compound and, thereafter, polycondensing the resultant reaction product in the presence of a titanium compound and a pentavalent phosphorous compound. JP 60147430 discloses a method of producing a polyester by esterifying terephthalic acid, adipic acid and 1,4-butanediol in the presence of a titanium compound, and then polycondensing the resulting reaction product in the presence of a titanium compound and a pentavalent phosphorus compound. Adding the phosphorus compound as a separate compound before the polycondensation step tends to cause deactivation of the titanium catalyst.

Therefore, there is a need to develop a process for producing polyester, especially an adipic acid-base polyester or copolymer thereof, with little or no discoloration.

SUMMARY OF THE INVENTION

The term "polybutylene adipate" used in the invention is exchangeable with the term "butanediol adipate" or "1,4-butanediol adipate"

The invention provides a process that can be used to produce polyester such as, for example, polyesters of polyalkylene adipate or a copolymer thereof, such as polybutylene adipate or a copolymer thereof. The process comprises contacting, in the presence of a catalyst, at least one carbonyl compound with an alcohol, preferably an alkylene glycol, in which the catalyst comprises a titanium compound and a phosphorus compound, preferably a complex of titanium and mixed alkyl phosphate esters.

DETAILED DESCRIPTION OF THE INVENTION

According to the invention, any carbonyl compound, which when combined with an alcohol, can produce an ester or polyester can be used. Generally, such carbonyl compounds include, but are not limited to, acids, esters, amides, acid anhydrides, acid halides, salts of carboxylic acid oligomers or polymers having repeat units derived from an acid, or combinations of two or more thereof. The presently preferred acid is an organic acid such as a carboxylic acid or ester thereof, or salt thereof. The presently preferred process is the polymerization of (1) an acid or ester and (2) an alcohol or glycol for the production of a polyester.

A preferred process for producing an ester or polyester comprises, consists essentially of, or consists of contacting a reaction medium with a composition disclosed above in the first embodiment of the invention. The reaction medium can comprise, consist essentially of, or consist of an alcohol and either (1) an organic acid, a salt thereof, an ester thereof, or combinations thereof or (2) an oligomer having repeat units derived from an organic acid or ester.

The preferred organic acid has the formula of $HO_2CACO_2H$ in which A is an alkylene group, an arylene group, alkenylene group, or combinations of two or more thereof. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. The presently preferred organic acid is adipic acid, phthalic acid, or terephthalic acid because the polyesters produced therefrom have a wide range of industrial applications.

Examples of suitable esters include, but are not limited to, dimethyl adipate, dimethyl phthalate, dimethyl terephthalate, methyl benzoate, dimethyl glutarate, and combinations of two or more thereof.

Any alcohol that can esterify an acid to produce an ester or polyester can be used in the present invention. The presently preferred alcohol has the formula of $R(OH)_n$, an alkylene glycol of the formula $(HO)_nA^1(OH)_n$, or combinations thereof in which each R can be the same or different and is a hydrocarbyl radical having 1 to about 10, preferably 1 to about 8, and most preferably 1 to 5 carbon atoms per radical. The presently preferred R is an alkyl radical, either branched or straight chain. $A^1$ is an alkylene radical having 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently most preferred alcohol is an alkylene glycol such as 1,4-butanediol.

According to the invention, the catalyst can comprise, consist essentially of, or consist of a titanium compound and a phosphorous compound. The catalyst can further comprise a solvent. Preferably, the catalyst is a reaction product, or complex, of the titanium compound and the phosphorous compound.

The preferred titanium compounds are organic titanium compounds as disclosed in U.S. Pat. No. 6,066, 714, disclosure of which is herein incorporated by reference and is omitted herein for the interest of brevity. The presently preferred titanium compounds are tetraalkyl titanates. The presently most preferred tetraalkyl titanate is tetra-isopropyl titanate, commercially available as TYZOR® TPT, available from E. I. du Pont de Nemours & Company, Wilmington, Del., USA.

According to the invention, the titanium compound, or the complex or reaction product of the titanium compound and the phosphorous compound, can also be combined with a zirconium compound to produce a mixture comprising the titanium compound and the zirconium compound such as, for example, zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof. The molar ratio of Ti/Zr can be in the range of from about 0.001:1 to about 10:1.

The titanium compounds suitable for use in the invention can be produced by means well known to one skilled in the art such as that disclosed in U.S. Pat No. 6,066,714, disclosure of which is herein incorporated by reference.

According to the invention, the phosphorous compound can be any phosphorous compound so long as it can facilitate the production of polyester or its copolymer having little or no discoloration. Preferably, the phosphorous compound has at least one OH group.

Examples of suitable organic phosphorous compounds include phosphate esters or combinations of two or more thereof having one or more OH groups bonded to the phosphorus atom.

Specific examples of phosphorous compounds include, but are not limited to, butyl phosphate, dibutyl phosphate, propyl phosphate, dipropyl phosphate, octyl phosphate, dioctyl phosphate, nonyl phosphate, dinonylphosphate, or combinations of two or more thereof. Presently, butyl phosphate, dibutyl phosphate, or combination thereof, is particularly preferred.

The molar ratio of phosphorous acid to titanium compound (P:Ti) can be any ratio that, when the catalyst is used as catalyst to produce a polyester, reduces the color of the polyester. The preferred ratio can be in the range of from about 0.1:1 to about 10:1, preferably about 0.5:1 to about 7:1, more preferably 1:1 to 4:1, and most preferably about 1 or less than 1.

A solvent can be present in the composition to produce a soluble or substantially soluble composition. Alternatively, the titanium compound can be present in the catalyst composition in the range of from about 0.01 to about 30, preferably about 0.1 to about 15, and most preferably 0.5 to 10 percent (%), based on total weight of the composition as 100%.

Any solvent that can substantially dissolve the catalyst composition disclosed above can be used in the present invention. The presently preferred solvent is water or an alcohol having the formula of $R(OH)_n$, an alkylene glycol of the formula $(HO)_nA^1(OH)_n$, a polyalkylene glycol or alkoxylated alcohol having the formula of $RO[CH_2CH(R)O]_nH$, or combinations of two or more thereof in which each R, $A^1$, and n are the same as disclosed above. Examples of suitable solvents include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently preferred solvent is ethanol, ethylene glycol, or combinations thereof The catalyst composition can be produced by any means known to one skilled in the art such as that disclosed in U.S. Pat. No. 6,075,115, disclosure of which is incorporated herein by reference or by simply combining or mixing the components together, preferably under a condition sufficient to effect the production of a complex or a reaction product. For example, an alkyl phosphate ester such as, for example, butyl phosphate ester, and isopropyl alcohol can be mixed with a titanium compound such as, for example, tetra-isopropyl titanate (TYZOR® TPT, available from E.I. du Pont de Nemours & Company) to produce a mixture which can be treated, for example, at a temperature in the range of from about 10 to about 80, more preferably about 30 to about 40° C. for about 0.5 to about 10, preferably 1 to 5 hours under a pressure that can contain the mixture.

The presently most preferred catalyst is TYZOR® IAM (also available from E.I. du Pont de Nemours & Company), a complex or reaction product of tetra-isopropyl titanate, butyl phosphate and dibutyl phosphate. The catalyst has a CAS registration number of 109037-78-7. The molar ratio of butyl phosphate to dibutyl phosphate is approximately 1:1.

The contacting of the at least one carbonyl compound and alcohol in the presence of the catalyst can be carried out by any suitable means. For example, the carbonyl compound and alcohol can be combined before being contacted with the catalyst.

Any suitable condition to effect the production of an ester or polyester can be used and can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the alcohol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 4:1.

The catalyst, expressed as Ti, can be present in the range of about 0.0001 to about 30,000 parts per million by weight (ppmw) of the medium comprising the carbonyl compound and alcohol, preferably about 0.001 to about 1,000 ppmw, and most preferably 0.001 to 100 ppmw. Other ingredients also can be present to enhance catalyst stability or performance.

A preferred process for producing an ester or polyester comprises, consists essentially of, or consists of contacting a reaction medium with a composition as disclosed below. The reaction medium can comprise, consist essentially of, or consist of a glycol and either (1) an adipic acid or terephthalic or phthalic acid, a salt thereof, an ester thereof, or combinations thereof or (2) an oligomer having repeat units derived from an adipic acid or terephthalic acid or ester. The reaction medium can further comprise an antioxidant or stabilizer such as, for example, a phosphite.

For example, in a process for making a copolymer of polybutylene terephthalate and polybutylene adipate, dimethyl terephthalate is transesterified (ester exchanged) with 1,4-butanediol using an organic titanate catalyst. Polybutylene adipate, produced in a separate reaction, is mixed with the resultant oligomer and the mixture polycondensed to give a copolymer of polybutylene terephthalate/adipate. If desired, a phosphite stabilizer can be added with the polybutylene adipate.

The following Examples are provided to further illustrate the present invention and are not to be construed as to unduly limit the scope of the invention.

EXAMPLES

TYZOR® IAM is a commercially available product. It can be produced by combining in a 250 ml beaker 49.2 g of mixed butyl phosphate ester (with a mole ratio of approximately 1:1 mono-butyl phosphate to di-butyl phosphate), available from E.I DuPont, Wilmington, Del. USA), and 25 g of ethyl alcohol with agitation/stirring to produce a mixture to which 79.3 g of tetra-isopropyl titanate (TYZOR® TPT, obtained from DuPont, Wilmington, Del., USA) was added slowly with continuing agitation/stirring. The mixture was further stirred at 30–40C. for 2 hours to give a clear colorless liquid containing 8.7% Ti. The catalyst has a CAS registration number of 109037-78-7 and is the TYZOR® IAM used in the examples below.

Example 1

A 1-liter autoclave was charged with 46.5 g of dimethyl terephthalate (DMT) and 58 g of 1,4-butanediol (BDO). The autoclave was evacuated and swept with N2 three times. The content was heated to 167° C. at which DMT dissolved and at which time 1.6 ml of a 5% by weight solution of TYZOR® TBT (tetrabutyl titanate) in BDO was added. The temperature of the charge was raised slowly rose to 21 0° C. over the next 39 minutes, during which time methanol, produced during the transesterification step was removed (by atmospheric distillation) and collected in a receiver. When methanol stopped distilling, 10.1 g of butanediol adipate (BDOAd) and 0.06 g of IRGAFOS® TNPP (an antioxidant supplied by Ciba Specialty Chemicals, Hawthorne, N.Y. USA) were added. The heating continued to 255° C. and the vacuum slowly reduced to 0.1–0.2 mm Hg (13–26 Pa). The temperature of the charge rose to 260° C. over the next 69 minutes during which time BDO and other volatile products were removed (by vacuum distillation). When the milliAmps reading on the agitator reached 500+ the reaction was judged to be complete. Heating was stopped, the vacuum broken and the resultant polymer slowly poured into a pan containing cold water. The resultant polymer was orange in color and had an intrinsic viscosity (IV) of 1.01.

Example 2

Example 1 was repeated except the I RGAFOS® TNPP was not added. The ester exchange took 33 minutes and polycondensation 60 minutes to complete. The color of the resultant polymer was dark pink and it had an IV of 1.16.

Example 3

Example 1 was repeated, except 1.3 ml of a 10% solution of TYZOR® IAM in BDO was added in place of the TYZOR® TBT solution. The ester exchange took 37 minutes and the polycondensation 95 minutes to complete. The color of the resultant polymer was white, and it had an IV of 1.14.

Example 4

A 1-liter autoclave was charged with 46.5 g of DMT, 62.5 g of BDO and 5.5 g of adipic acid. The autoclave was evacuated and swept 3 times with N2 and then heating begun as in Example 1. When all of the DMT and adipic acid was in solution 1.1 ml of a 20% solution of a mixture of TYZOR® LA (titanium bis-ammonium lactate; also obtained from E.I. du Pont de Nemours & Company) and sodium hypophosphite in BDO was added. Methanol distilled off over the next 45 minutes and then vacuum was applied and heating to 260° C. begun. The solution was very cloudy and over the next 87 minutes viscosity never built beyond a 250 milliAmps reading. The polycondensation was stopped at this time and the unfinished polymer poured slowly into a pan of water. The color of the resultant polymer was white. However, the IV was only 0.21.

Example 5

Example 2 was repeated, except 1 ml of a 50% solution of Victastab HWP (phosphonic acid, (hydroxymethyl)-, ethoxylated CAS# 68951-50-8; obtained from Akzo Nobel, Dobbs Ferry, N.Y., U.S.A) in BDO was added with the BDOAd and IRGAFOS® TNPP. The esterification time was 88 minutes, except there was no viscosity build up. Heating was stopped, vacuum broken and the molten polymer poured slowly into cold water. The color of the resultant polymer was white, however it had an IV of only 0. 18.

Example 6

Example 1 was repeated, except only 1.2 ml of a 5% solution of TYZOR® TBT in BDO was added as ester exchange catalyst and 0.3 ml of a 10% solution of TYZOR® IAM in BDO was added along with the BDOAd and IRGAFOS® TNPP. The ester exchange reaction took 60 minutes and polycondensation 79 minutes to complete. The color of the resultant polymer was light pink, and it had an IV of 1.04.

Example 7

Example 1 was repeated except that 0.8 ml of a 5% solution of mixed butyl phosphate ester in BDO was added with the BDOAd and IRGAFOS® TNPP. The ester exchange time was 42 minutes. The polycondensation was stopped after 110 minutes with the milliAmps only reaching 330 instead of 500+. The color of the resultant polymer was white, however it had an IV of only 0.58.

In the table below, the results of the above examples are summarized and the following abbreviations are used: AO, antioxidant; PolyC, polycondensation; BDO Ad is BDO Adipate (that is, pre-reacted BDO and Adipic Acid are added after ester exchange to minimize transition time in continuous process); TBT is TYZOR® TBT, trabutyl titanate; TNPP is IRGAFOS® TNPP, a trinonyl-phenyl-phosphite stabilizer; HWP is Victastab HWP, an ethoxylated phosphonic acid (hydroxymethyl), CAS# 951-50-8; IAM is TYZOR® IAM, a titanium and phosphate (mixed butyl phosphate and dibutyl phosphate) complex, CAS # 109037-78-7; MBP is mixed butyl phosphate ters; and LA/NaHP is an equimolar mixture of TYZOR® LA (a titanium lactate) and sodium hypophosphite.

| Ex. | Catalyst | Cat. Conc. | A/O | % AO | After Ester Ex. | Ester ex time | PolyC Time | IV | Color |
|---|---|---|---|---|---|---|---|---|---|
| 1 | TBT | 0.08 | TNPP | 0.06 | BDOAd | 39 Min. | 69 Min. | 1.01 | Orange |
| 2 | TBT | 0.08 | — | — | BDOAd | 33 Min. | 60 Min. | 1.16 | Dark pink |
| 3 | IAM | 0.13 | TNPP | 0.06 | BDOAd | 37 Min. | 95 Min. | 1.14 | White |
| 4 | LA/NaHP | 0.21 | TNPP | 0.06 | BDOAd | 45 Min. | 87 Min. | 0.21 | White |
| 5 | TBT | 0.08 | TNPP | 0.06 | BDOAd/HWP | 45 Min. | 88 Min. | 0.18 | White |
| 6 | TBT | 0.06 | TNPP | 0.06 | BDOAd/IAM | 60 Min. | 79 Min. | 1.04 | light Pink |
| 7 | TBT | 0.08 | TNPP | 0.06 | BDOAd/MBP | 42 Min. | 110 Min. | 0.58 | White |

The above table shows that, if tetrabutyl titanate was used as the transesterification catalyst for reacting dimethyl terephthalate and 1,4-butanediol, the copolymer was orange or pink, dependent on whether the TNPP stabilizer was added (example 1) or not (example 2). If a titanium-mixed butyl phosphate ester complex (CAS #109037-78-7) was used as the transesterification catalyst, then a pure white copolymer is produced (example 3).

The table also shows that if a mixture of an organic titanate such as titanium bis-ammonium lactate and sodium hypophosphite was used (example 4), no viscosity buildup was observed as indicated by the IV number indicating the phosphorus compound probably deactivated the catalyst. Similarly, if a phosphorus compound was added after the transesterification step (example 5) but before the polycondensation step, no viscosity buildup was observed indicating it probably deactivated the titanate catalyst.

The table further shows that if tetrabutyl titanate was used as the transesterification catalyst, and TYZOR® IAM was added as polycondensation catalyst (example 6), the color of the copolymer was light pink indicating the TYZOR® IAM must be added at the transesterification step to be effective. Finally, if tetrabutyl titanate was used as the transesterification catalyst along with the mixed butyl phosphate ester added in the same molar ratio as is present in TYZOR® IAM (example 7), again no viscosity buildup was observed indicating that the reaction product of tetrabutyl titanate and mixed butyl phosphate ester (TYZOR® IAM) must be used rather than adding separately the tetrabutyl titanate and mixed butyl phosphate ester.

In summary, the table illustrates that TYZOR® IAM should be added in or during ester exchange, and that adding a phosphorous compound in the polycondensation step instead of the esterification step inevitably produced polyesters having undesirable colors.

What is claimed is:

1. A process comprising contacting at least one carbonyl compound, in the presence of a catalyst, with an alcohol under a condition sufficient to effect the production of a substantially colorless polymer wherein said catalyst is produced by heating a mixture comprising a tetraalkyl titanate and a phosphorous compound at about 10° C. to about 80° C.

2. A process according to claim 1 wherein said at least one carbonyl compound is adipic acid, ester thereof, or combinations thereof.

3. A process according to claim 1 wherein said at least one carbonyl compound comprises (1) adipic acid, ester thereof, or combinations thereof and (2) terephthalic acid, ester thereof, or combinations thereof.

4. A process according to claim 1, 2, or 3 wherein said alcohol is 1,4-butanediol.

5. A process according to claim 1, 2, or 3 wherein said catalyst is a complex of said tetra-isopropyl titanate and said phosphorous compound; said phosphorous compound is butyl phosphate, dibutyl phosphate, or combinations thereof; and is produced by heating a mixture comprising said tetraalkyl titanate and said phosphorous compound at about 30° C. to about 40° C.

6. A process according to claim 4 wherein said catalyst is a complex of said tetra-alkyl titanate and said phosphorous compound; and is produced by heating a mixture comprising said tetraalkyl titanate and said phosphorous compound at about 30° C. to about 40° C.

7. A process according to claim 6 wherein said catalyst is a complex of said tetra-isopropyl titanate and said phosphorous compound; and said phosphorous compound is butyl phosphate, dibutyl phosphate, or combinations thereof.

8. A process comprising contacting at least one carbonyl compound, in the presence of a catalyst, with an alcohol wherein said at least one carbonyl compound comprises adipic acid, ester thereof, or combinations thereof;

said catalyst comprises tetra-isopropyl titanate and a phosphorous compound and is produced by heating a mixture comprising said tetraalkyl titanate and said phosphorous compound at about 10° C. to about 80° C.; and said phosphorous compound is selected from the group consisting of butyl phosphate, dibutyl phosphate, propyl phosphate, dipropyl phosphate, octyl phosphate, dioctyl phosphate, nonyl phosphate, dinonylphosphate, and combinations of two or more thereof.

9. A process according to claim 8 wherein said at least one carbonyl compound further comprises terephthalic acid, ester thereof, or combinations thereof; said phosphorous compound is selected from the group consisting of butyl phosphate, dibutyl phosphate, and combinations thereof; said alcohol is 1,4-butanediol; and said catalyst is produced by heating said mixture at about 30° C. to about 40° C.

10. A process according to claim 8 or 9 wherein said catalyst is a reaction product of said tetra-isopropyl titanate and said phosphorous compound.

11. A process comprising contacting 1,4-butanediol, in the presence of a catalyst, with at least one carbonyl compound wherein said at least one carbonyl compound comprises (1) adipic acid, ester thereof, or combinations thereof and (2) terephthalic acid, ester thereof, or combinations thereof; said catalyst comprises tetra-isopropyl titanate and a phosphorous compound selected from the group consisting of butyl phosphate, dibutyl phosphate, and combinations thereof; and said catalyst is produced by heating a mixture comprising said tetraalkyl titanate and said phosphorous compound at about 30° C. to about 40° C.

12. A process comprising contacting 1,4-butanediol, in the presence of a catalyst, with at least one carbonyl compound wherein said at least one carbonyl compound comprises terephthalic acid, dimethyl terephthalate, adipic acid, dimethyl adipate, or combinations thereof of two or more thereof; and said catalyst comprises tetra-isopropyl titanate and a phosphorous compound selected from the group consisting of butyl phosphate, dibutyl phosphate, and combinations thereof and is produced by heating a mixture comprising said tetraalkyl titanate and said phosphorous compound at about 30° C. to about 40° C.

13. A process according to claim 12 wherein said process comprises (1) contacting said 1,4-butanediol with said dimethyl terephthalate to produce polybutylene terephthalate; (2) contacting said 1,4-butanediol with said adipic acid to produce butanediol adipate; and (3) contacting said polybutylene terephthalate with said butanediol adipate under a polycondensation condition effective to produce a copolymer.

* * * * *